United States Patent [19]

Kelly, Jr.

[11] Patent Number: 4,740,088
[45] Date of Patent: Apr. 26, 1988

[54] SAFETY AND SANITARY SYSTEM IMPROVEMENTS FOR FROZEN CONFECTIONS BLENDING MACHINES

[76] Inventor: James J. Kelly, Jr., 100 S. Newtown St., Newtown Square, Pa. 19073

[21] Appl. No.: 925,901

[22] Filed: Nov. 3, 1986

[51] Int. Cl.$^4$ .......................... A23G 9/02; A23G 9/04; B01F 7/24
[52] U.S. Cl. ..................................... 366/138; 62/342; 99/452; 99/460; 366/203; 366/318; 366/347
[58] Field of Search ................. 99/348, 492, 452, 494, 99/460, 516, 517, 460; 426/518, 519; 425/206–209, 151, 135, 200, 182; 366/194–198, 203, 138, 204, 206, 207, 318, 212, 219, 279, 323, 140, 142, 247; 222/108, 63, 52, 413; 241/282.1; 62/342, 68

[56] References Cited

U.S. PATENT DOCUMENTS 4,448,114  5/1984  Mayer ..................................... 99/494
4,502,377  3/1985  Hall, Jr. ............................. 99/494 X
4,506,988  3/1985  Reed ..................................... 366/203
4,548,054  10/1985 Levine ................................... 62/342
4,548,508  10/1985 Verkler ................................. 366/318
4,590,851  5/1986  Mayer ................................... 99/455
4,590,852  5/1986  Mayer et al. .................. 366/318 X Primary Examiner—Timothy F. Simone
Attorney, Agent, or Firm—Steele, Gould & Fried

[57] ABSTRACT

A frozen confections blending machine, especially for blending basic frozen comestibles with flavors of users' choices, whereby each end product may vary, in quick succession, from a previous one. To perform the therefor required change-over procedure, the subject improvements were introduced, including facilities for rapid, frequent and sanitary cleaning operations between product changes, such as a permanently built-in sink having drainage, protective shieldings against random soilage of the internal machine components and provisions for improved safety of machine operations of those parts which were not rendered safe by the sanitary improvements.

9 Claims, 2 Drawing Sheets

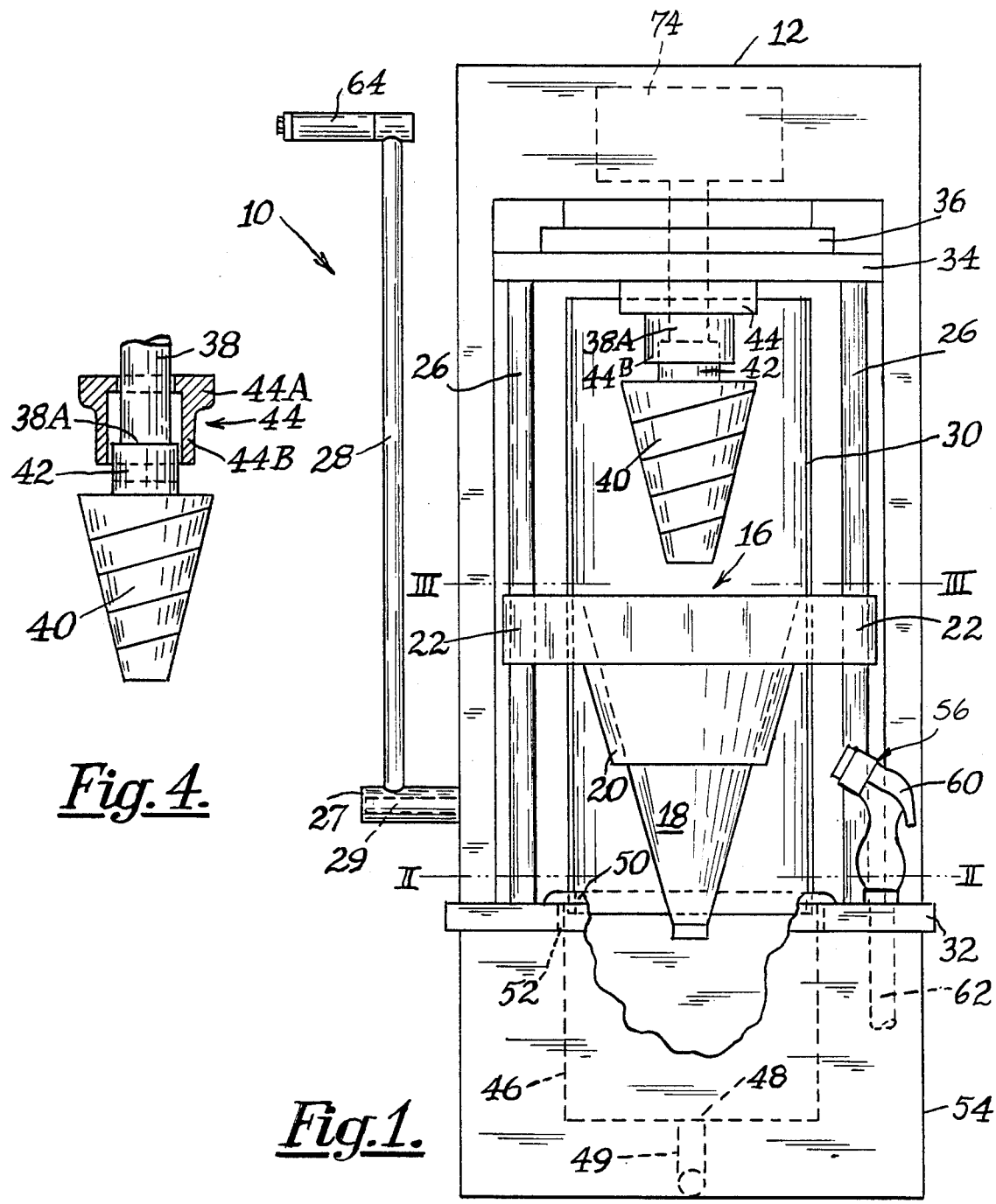
Fig.4.
Fig.1.
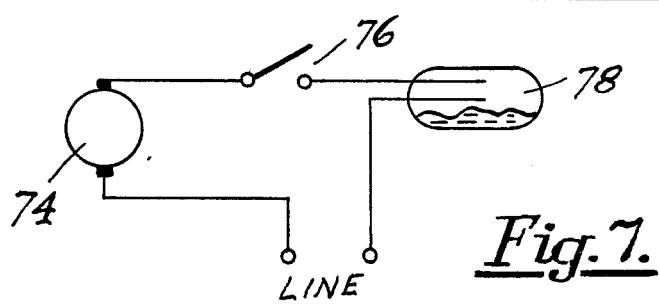
Fig.7.

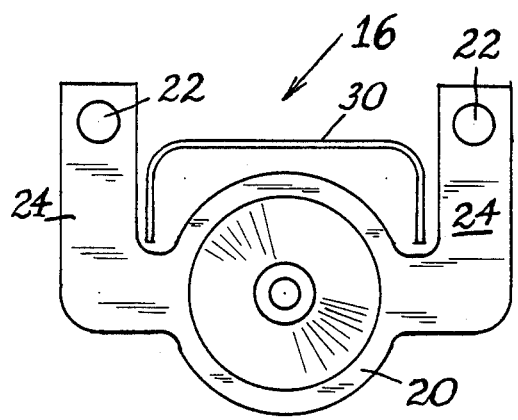
Fig. 3.
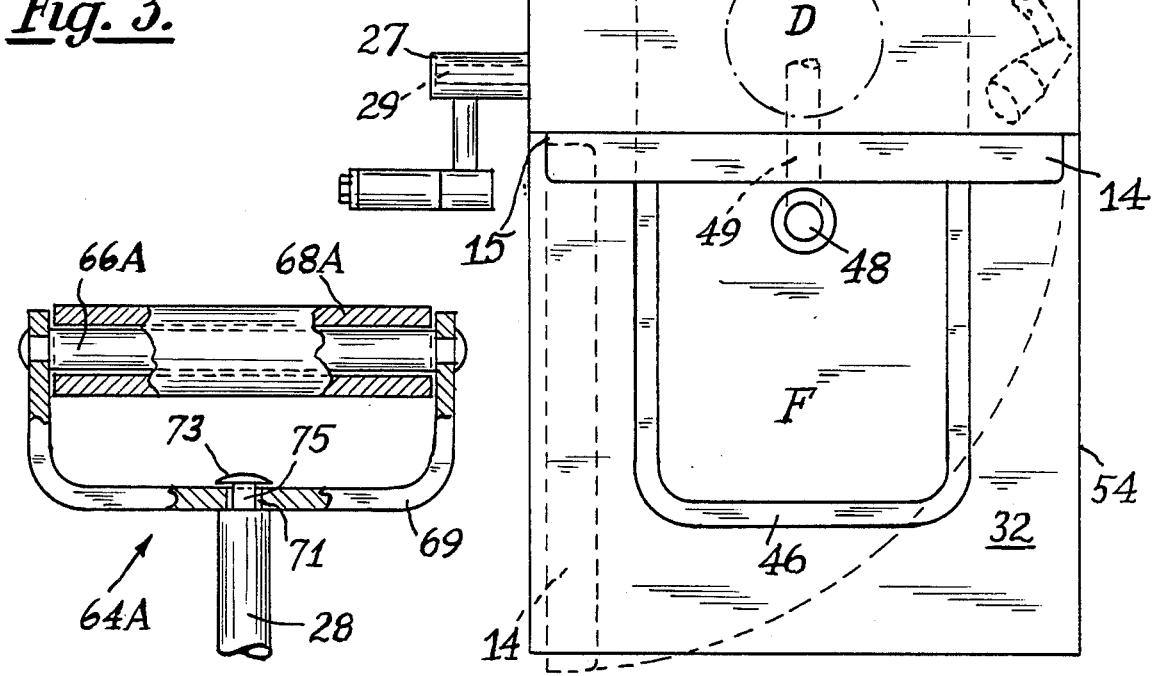
Fig. 6.
Fig. 2.
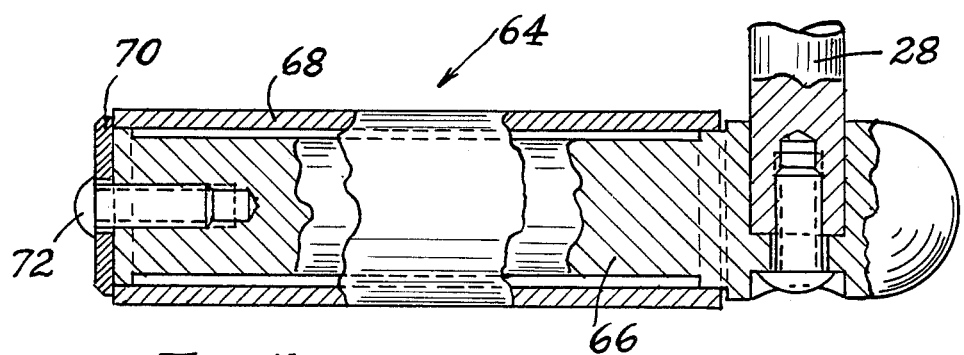
Fig. 5.

SAFETY AND SANITARY SYSTEM IMPROVEMENTS FOR FROZEN CONFECTIONS BLENDING MACHINES

Various patents of prior art teach apparatus for processing frozen comestibles per se and in combination with other features complementing both the basic apparatus performance and effectiveness. These teachings include, but may not be limited to, the following examples and references:

Reed, U.S. Pat. No. 2,626,133, Jan. 20, 1953, n/a
Hall, Jr. U.S. Pat. No. 4,502,377, Mar. 5, 1985, 99/492
Reed, U.S. Pat. No. 4,506,988, Mar. 26, 1985, 366/203
Mayer, U.S. Pat. No. 4,448,114, May 15, 1985, 99/494
Levine, U.S. Pat. No. 4,548,054, Oct. 22, 1985, 62/342
Verkler, U.S. Pat. No. 4,548,508, Oct. 22, 1985, 366/195

Whereas each of the aforementioned apparatus appears to serve its intended purpose, it seems that, firstly, safety and sanitary considerations were partly or completely disregarded and, secondly, the various machine designs do not provide for optimum convenience of operation, sanitary cleaning and servicing, be it for supplying the-to-be processed substances or for the cleaning, maintenance and repair of the apparatus, respectively.

It should be noted that the herein described improvements are the results of the applicant's considerable experience in the design, and construction of apparatus of the subject nature, their operation, servicing and maintenance as such and in comparison with existing, however less practical machines.

SUMMARY OF INVENTION

The invention extends to a frozen confections blending machine having the following major characteristics:

(1) The incorporation of a sink positioned underneath the mixing area to accept and collect splash and product over-run and to discard it conveniently at the location of origin allowing for easy and continuous sanitary cleanup.

(2) The protection of guide bearings carrying the saddle for the cone against exposure to and the ill-effects of product splash and cleaning spray, respectively, thereby also extending considerably the useful life of, especially, the costly bearings and their sanitary condition.

(3) A door having a washable inside surface like the entire inside of the apparatus enclosure is hinged to the enclosure allowing for the convenient cleaning of its inside surface without the removal of panels used by other machines requiring a separate cleaning effort and procedure.

(4) The incorporation of an elongated and modified auger shank and of a separate splash guard, thereby preventing product, product splash or cleaning water entry into, especially, the auger's interior, constituting an important sanitary factor.

(5) Means for delivering water to the auger, the cone and all inside surfaces of the enclosure for cleaning, including hoses, spray devices valves and related hardware and the sink, mentioned in paragraph (1) of this summary, constituting a closed water circuit, facilitating the expeditions cleaning, especially, between changes of additives and flavors from one product batch to another.

(6) Handles designed according to human engineering principles affording a high degree of comfort and convenience to and precluding early fatigue of the operating personnel, especially, when rapid and continuous production is required.

(7) A dependable control of the speed of the motor which effects the rotation of the auger with regard to the loading of the cone, primarily, to avoid product splashing and unnecessary cleaning of soiled surfaces.

Further advantages of the subject improvements—per se—and over prior art will become more apparent from the following description and the accompanying drawing.

In the drawing, forming a part of this application:

FIG. 1 is a schematic front elevation of a frozen confections blending machine in accordance with this invention, FIG. 2 is a plan view in the plane II—II of the sink including several related component parts, FIG. 3 shows a plan view in the plane III—III of the saddle, its bearings and splash shield, FIG. 4 is a front elevation of the auger having the improved splash-proof shaft configuration, FIG. 5 illustrates an engineered version of an operating handle, FIG. 6 is another handle variety offering additional operational comfort and FIG. 7 presents a schematic of an electric safety circuit for the motor control and cleanliness of operation.

Before referring to the drawing, wherein like reference numerals designate like or corresponding parts, it should be noted that the illustrations are schematic rather than pictorial. This mode was chosen to more clearly depict the substance and the significance of each detail and its improvement on its own merit prior to the discussion of its function in combination with the other elements of this apparatus or with other machines of this category.

Referring now to FIG. 1, the frozen confections blending machine 10, hereinafter called the machine, presents in front view the basic elements including those constituting individual improvements and jointly those of the entire machine 10. The machine 10 is inside an enclosure 12 of a durable material having a routinely and continuously washable material on all of its interior surfaces. A door 14 having a joint 15 at one of its sides, as indicated in FIG. 2, is mounted permanently on the front side of the enclosure 12. When the door is open, it allows for its cleaning together with all other interior component parts through other improvements described later on in this disclosure. To service or repair the machine 10, said door 14 remains in the open position. When in this position, the door can be cleaned individually.

The saddle assembly 16, shown in the down position in FIG. 1, holds a blending container having the shape of an inverted, truncated cone, called the mixing cone 18 positioned within the saddle member 20 axially with respect to the operational center line of the machine. The saddle assembly 16 is equipped with a suitable bearing 22 at each of its two extremities 24, each bearing having a bore oriented vertically and capable of engaging a vertical guide rail 26 mounted within the enclosure 2 and positioned apart from each other so as to coact with said bearings 22. Considering the sizeable forces involved in the operation of this machine, the guide rails 26, the saddle member 20 and its bearings 22 must be of substantial strength and possibly of a more complex construction than shown in FIGS. 1 and 3, without, however, deviating from the inventive principles. The operational up and down movement of the saddle member 20 together with its components and the cone 18 is accomplished through rather conventional members and linkages among them, considered to be ancillary compared to the salient improvements and, therefore, omitted from both the description and the drawing. The handle arm 28 is the only respective part shown and that in FIG. 1, FIG. 2, and for further discussion in FIG. 5. While the main objective of the extremities 24 on the saddle member 20 is to remove the essential bearings 22 from the splash zone, a further protective item, namely, the splash shield 30 was arranged so as to surround like a semi-circle type apron said saddle member 20 and the mixing cone 18 when inserted into the latter. The aforementioned splash shield 30 may be of one piece, or consist of more such pieces of shorter lengths arranged about each other telescopically and overlapping each other in a manner so as to prevent the leaking of splashes into the now protected space, or be integral with the machine structure. Additional splash shields may be provided to comply with specialized requirements.

Whereas the lower ends of the guide rails 26 are mounted on a base plate 32, their upper ends are mounted in this case in a top plate member 34 which is integral with a herein only partially illustrated casting 36, containing (illustrated in phantom lines) a prime mover such as an electric motor 74 and, unless a direct drive is preferred, a transmission together with the customary accessories to transmit the power from the motor shaft to the auger shaft 38 which is aligned both axially and concentrically with the vertical axis of the saddle member 20 and positioned rotatably at a fixed elevation above the lowest position of the saddle member 20 as shown in FIG. 1.

The auger 40, equipped with the operational convolutions, has the shape of an inverted truncated cone of dimensions matching and coacting with those of the mixing cone 18. To save weight, material and operating power, most auger bodies have a hollow inside without any drain hole at the bottom, creating a highly unsanitary situation as upwardly splashed product quantities may collect in the interior of the auger and, worse yet, may remain there undetected for a prohibitive period of time.

This condition results not only in a health hazard and possible loss of business, but it also ill-effects the separation of flavors and ingredients when changing from one scheduled end product to another. To preclude the aforementioned adverse factors, a splash protection was devised for the auger shaft 38 as shown in FIG. 4. It consists of an elongated, modified auger shank 42 provided at the former end 38A of the shaft 38. A splash guard 44 is mounted on the lowest surface 46 of the casting 36. The splash guard 44 is a solid of revolution having a collar portion 44A and a downwardly extending apron 44B, the latter surrounding, at a minimum of play, said elongated auger shank 42, establishing the subject splash protection.

To perform the aforementioned actions proficiently, safely and with a high degree of compliance with sanitary requirements, a sink 46 having a drain 48 for the connection 49 with the respective local plumbing is provided, located directly and partly under the mixing area denoted as area D in FIG. 2 and partly extending horizontally to the area denoted as area F. The sink 46 is made of, say, stainless steel or any other suitable and durable material which is inert to the products and their constituents used in the subject processes. A possible mounting mode of the sink 46 is shown in FIG. 1. The sink 46 has a rim 50, formed outwardly along its upper edge, through which it is held in place when inserted into a complementary opening 52 formed in the base plate 32. To conceal these utility parts from the view of users and observers, a skirt 54 is provided underneath the base plate 32 being, in essence, an extension of the enclosure 12, imparting a very attractive appearance of the machine 10.

To complete the sanitary equipment, at least one spray device 56 is provided inside or about the enclosure 12. Such a spray device 56 may be rotatable and tiltable and is, for example, adjustable in such a manner so as to clean the interior of the auger, the mixing cone and the entire interior. Such a spray device 56 may have a valve (not shown) operable by a handle 60 and a hose, or collar connection 62 to the local water supply line.

Although the function of the sink 46 and its accessories may be self-explanatory, the following is emphasized: Because the sink 46 extends horizontally from the mixing area D to the front area F, it can be used for the cleaning of all interior parts in their mounted positions, in fact, if required while in motion, whereas the cleaning of removed, or removable parts, or those not even belonging to the machine, can be cleaned in the forward portion F of the sink 46. Aside from the cleaning features provided by the sink 46, its position, partly under the mixing area D allows for the catching of splash and product over-run and for its immediate and convenient discarding.

Considering the high frequency of usage of machines of this kind, and their manual operations, an effort was made to provide a handle which allows for the convenient and continuous machine actuation without overtaxing the operators' endurance. The modified handle 64 is shown in FIG. 5. The handle 64 consists of a cylindrical core 66 which is attached fixedly and perpendicular to the handle arm 28 in a conventional manner. A cylindrical sleeve 68 is mounted about said core 66 in a loose fit and secured in this position through a washer 70 and a binding screw 72, the latter being inserted axially into said core 66 at its end opposite to its installation with the handle arm 28. In this manner, regardless of the force exerted on the sleeve 68 by an operator's fist, it will not result in any friction between the attendant's hand and the handle and it will, therefore, not cause the operator's undue fatigue.

Another handle configuration 64A offering a comfortable negotiation is shown in FIG. 6. A cylindrical sleeve 68A is mounted at a loose fit on a core 66A. Said core 66A is mounted fixedly at each of its two ends in holes formed in the ends of a frame 69. The latter is mounted with a loose fit between a hole 71 formed in the bottom of said bracket 69 and an extension 75 of said arm 28 used also as the retaining rivet 73. The additional degree of freedom provided by this handle type may be preferred by some operators.

The aforedescribed two handle configurations are equipped with a quick-release pin 27 indicated, schematically, inside the handle shaft 29, allowing for the convenient removal of the handle assembly 28, 29, 64 and the removal of any enclosure panels for cleaning purposes.

As presented at various occasions in the foregoing, splash is a continuous problem with devices of this nature and sanitary problems caused by splash must be constantly addressed. It should be noted that the following discussion of this situation and the description of remedial actions presented in the spirit of this disclosure is also an explanation of the use of this machine and its operating instructions.

Basically, splash is caused by the rotation of the auger 40. While it is necessary that the auger rotation be up to full speed and power before it enters into the frozen mix which has been deposited into the mixing cone 18 when in its lowest position, it is desirable that the auger 40 be at low speed or at standstill (motor off) when it is removed (raised) from the mixing cone 18. Several methods and devices may lend themselves for this objective. However, the herein believed to be novel approach uses the most simplistic means and is one in which the operator's interaction and feel for a particular mixed product are employed.

The respective concept uses, as indicated in the schematic of FIG. 7 two switches 76 and 78, connected in series, to control the motor 74 which drives the auger 40. Both switches must be activated for the motor to run. A typical but not exclusive program sequence would be as follows:

(1.) After the operator loads the cone 18 with both a frozen product and a flavor additive, the foot switch 76 is depressed to its closed position.

(2.) The operator then starts to turn the lever arm 28 downwards, which elevates the mixing cone 18 to the still stationary auger 40. Just before the auger 40 enters the mixing cone 18, then filled with a frozen product, the linkages (not shown) engage a so-called limit switch 78, (such as, for example, a position-sensitive mercury switch), which completes the circuit for the motor 74, activating the drive.

(3) After the product has been fully extruded from the mixing cone 18, the operator releases the foot switch 76. The auger 40 will then rapidly slow down, eventually to a full stop.

(4.) The operator may lower the mixing cone 18 even before the auger is at rest by raising the handle arm 28 without the danger of splashing the interior of the machine 10 or the person(s) preparing the confection. In addition to being an important sanitary feature, this circuit arrangement is also a significant safety and accident prevention factor, especially, as parts moving at high speed are involved and that are necessarily in the proximity of personnel.

It is understood that the herein shown and described embodiments of the subject invention and details are but illustrative and that variations, modifications and alterations are feasible within the spirit of these teachings.

I claim:

1. A frozen confections blending machine having within an enclosure defining an interior and an exterior, a saddle assembly for supporting a mixing cone over a mixing area, a handle arm with a handle engaging a linkage for upward and downward movement of said saddle assembly, a motor, an auger rotatable by said motor, and motor controls, the machine comprising:
   a sink installed integrally with said enclosure, said sink equipped with a drain and a connection to utility plumbing, the sink being positioned partly underneath said mixing area, partly extending horizontally to the exterior and in front and outside of said enclosure,
   at least one splash shield extending around a rear of said saddle assembly and shielding the saddle assembly and said auger along a height of the interior,
   a splash guard having a cylindrical collar portion and a cylindrical apron portion, said splash guard mounted in the interior of the enclosure, above the auger,
   an elongated auger shaft carrying the auger, said elongated auger shaft extending through said splash guard,
   whereby said at least one splash shield and said splash guard catch splashes and thereby prevent soilage of internal machine surfaces and component parts.

2. A frozen confections blending machine according to claim 1, further comprising:
   a door, rotatable horizontally about a vertical hinge mounted to a front of said enclosure, for closing said enclosure during normal operation of the machine and for opening said enclosure for purposes of process inspection, cleaning, maintaince and repair.

3. A frozen confections blending machine according to claim 2, wherein said handle has a cylindrical core mounted fixedly on and perpendicular to said handle arm, and a cylindrical sleeve mounted rotatably and in a loose fit on said cylindrical core.

4. A frozen confections blending machine as defined in claim 2, wherein
   the handle includes a frame having three holes formed therein,
   said frame mounted rotatably on said handle arm and an extension thereof mating with one of said holes,
   a core mounted fixedly across said frame and arrested within two of said holes of said frame by means of rivets,
   a cylindrical sleeve placed over said core in a loose fit,
   said handle adapted to provide the convenience of two degrees of operational freedom to a machine operator.

5. A frozen confections blending machine according to claim 2, further comprising:
   a circuit with at least two switches for control of said motor,
   one of said two swtiches begin an operator actuated switch located at and excessible from outside said enclosure,
   an other of said two switches being a linkage-operated limit switch positioned to be engaged by the linkage of said machine upon actuation of said handle,
   said operator actuator switch when engaged enabling operation of the motor and when disengaged operation of the motor, regardless of position of said other switch, respectively, whereby the circuit constitutes both a significant sanitary and safety feature.

6. A frozen confections blending machine according to claim 2, further comprising:
   a spray device mounted on said machine,
   said spray device having a valve and a hose conenction to a utility water supply.

7. A frozen confections blending machine according to claim 2, further comprising:
   a handle arm attachable to and detachable from, selectively, a handle shaft by means of a quick-release pin engagement.

8. A frozen confections blending machine according to claim 1, further comprising:

a saddle member having extremities equipped with bearings extending beyond the diameterical orientation and guide rails postioned correspondingly at remote locations a splash zone adjacent the auger 9. A frozen confections blending machine according to claim 1, further comprising:
removable panels in the enclosure.

* * * * *

UNITED STATES PATENT AND TRADEMARK OFFICE
CERTIFICATE OF CORRECTION

PATENT NO. : 4,740,088

DATED : April 26, 1988

INVENTOR(S) : James J. Kelly, Jr.

It is certified that error appears in the above-identified patent and that said Letters Patent is hereby corrected as shown below:

In the Claims:

Col. 6, line 19, "maintaince" should be --maintenance--.

Col. 6, line 44, "swtiches" should be --switches--.

Col. 6, lines 60-61, "conenc-tion" should be --connection--.

Col. 7, line 3, "postioned" should be --positioned--.

Col. 7, line 4, after "locations", insert --so as to remove the said bearings and said guide rails from--.

Col. 7, line 4, after "auger" insert a --.--.

Signed and Sealed this

Eleventh Day of October, 1988

Attest:

DONALD J. QUIGG

Attesting Officer      Commissioner of Patents and Trademarks